United States Patent
Nishizawa et al.

(10) Patent No.: US 9,631,669 B2
(45) Date of Patent: Apr. 25, 2017

(54) OIL-IMPREGNATED SINTERED BEARING AND PRODUCTION METHOD THEREFOR

(71) Applicant: HITACHI CHEMICAL COMPANY, LTD., Tokyo (JP)

(72) Inventors: Naoki Nishizawa, Kashiwa (JP); Hideaki Kawata, Matsudo (JP); Hidekazu Tokushima, Kashiwa (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 378 days.

(21) Appl. No.: 14/258,500

(22) Filed: Apr. 22, 2014

(65) Prior Publication Data

US 2014/0314354 A1    Oct. 23, 2014

(30) Foreign Application Priority Data

Apr. 22, 2013 (JP) .................................. 2013-089323

(51) Int. Cl.
*C22C 28/00* (2006.01)
*F16C 33/10* (2006.01)
*F16C 33/14* (2006.01)
*F16C 33/12* (2006.01)

(52) U.S. Cl.
CPC .......... *F16C 33/104* (2013.01); *F16C 33/128* (2013.01); *F16C 33/145* (2013.01); *F16C 33/1095* (2013.01)

(58) Field of Classification Search
None
See application file for complete search history.

(56) References Cited

U.S. PATENT DOCUMENTS

| 2005/0063856 | A1 | 3/2005 | Miyasaka | |
| 2007/0231182 | A1* | 10/2007 | Veloff | B22F 9/04 419/22 |
| 2013/0101244 | A1* | 4/2013 | Nishizawa | C22C 9/00 384/279 |

FOREIGN PATENT DOCUMENTS

| CN | 101251152 A | 8/2008 |
| JP | A-2003-120674 | 4/2003 |
| JP | 2004-138215 A | 5/2004 |
| JP | A-2005-82867 | 3/2005 |

OTHER PUBLICATIONS

Aug. 31, 2015 Office Action issued in Chinese Patent Application No. 201410162085.3.

* cited by examiner

*Primary Examiner* — Jessee Roe
*Assistant Examiner* — Ngoclan T Mai
(74) *Attorney, Agent, or Firm* — Oliff PLC (57) ABSTRACT

The oil-impregnated sintered bearing made of iron-copper sintered alloy consisting of 10-59% of Cu, 0.5-3% of Sn, and balance of Fe and impurities, includes pores in the iron-copper sintered alloy matrix of not less than 800 per $mm^2$, has pores exposed at 20-50% by area ratio at the inner circumferential surface with diameters greater than 100 μm, not more than 0.5%, respectable to the total pores number. The pores number with diameters greater than 80 μm and not greater than 100 μm, not more than 0.1%, respectable to the total pores number with diameters greater than 60 μm and not greater than 80 μm is 0.5-1.5%, respectable to the total pores number, with diameters greater than 40 μm and not greater than 60 μm is 0.8-3% respectable to the total pores number, and the remainder pores are with diameters less than 40 μm.

3 Claims, 1 Drawing Sheet

OIL-IMPREGNATED SINTERED BEARING AND PRODUCTION METHOD THEREFOR

BACKGROUND OF THE INVENTION

Technical Field

The present invention relates to an oil-impregnated sintered bearing and to a production method therefor. In particular, the present invention relates to an oil-impregnated sintered bearing for an electric motor, which may be mounted in an automobile or the like, and relates to a production method therefor.

Background Art

Oil-impregnated sintered bearings are made such that a bearing body is formed of a porous sintered compact, and a lubricating oil is impregnated into pores of the sintered compact. Therefore, the oil-impregnated sintered bearings can be used for long periods without providing additional oil. Because of this advantage, oil-impregnated sintered bearings are used in various bearing devices and have also been used as bearings for various electric motors in the manufacture of automobiles. The electric motors are arranged in interior spaces of automobiles, and therefore, it is undesirable if noise, so-called "squealing noise", is generated by metallic contact between a shaft and an inner circumferential surface of a bearing during sliding. In this regard, various means for preventing generation of the squealing noises have been developed.

According to the inventions disclosed in Japanese Patent Applications Laid-open Nos. 2003-120674 and 2005-082867, the following oil-impregnated sintered bearings are provided. These oil-impregnated sintered bearings do not produce squealing noises even when used in cold climates that reach a temperature of, for example, 20° C. below zero or 30° C. below zero. These oil-impregnated sintered bearings are formed with conflicting characteristics in which an open porosity is high but fluid permeability is low, thereby preventing generation of the squealing noises. The fluid permeability affects leakage characteristics of lubricating oil and oil pressure at a sliding surface. Therefore, an oil-impregnated sintered bearing with high fluid permeability tends to produce squealing noises during sliding in cold climates. On the other hand, when the fluid permeability is increased by increasing the density of an oil-impregnated sintered bearing, the number of pores is decreased. As a result, the open porosity is decreased, and oil-retaining characteristics are degraded. Accordingly, when the open porosity is increased in order to improve the oil-retaining characteristics, the fluid permeability is increased. Thus, the fluid permeability and the open porosity are in a trade-off relationship, and it is difficult to increase the open porosity (oil-retaining characteristics) and to decrease the fluid permeability at the same time.

In regard to this problem, in the inventions disclosed in the Japanese Patent Applications Laid-open Nos. 2003-120674 and 2005-082867, by using a porous reduced iron powder as an iron powder, an enormous number of microscopic pores are arranged in an iron phase of the oil-impregnated sintered bearing, whereby the open porosity is increased. Thus, while the fluid permeability is maintained to be low, the open porosity is increased, and the problem of the conflicting characteristics of the fluid permeability and the open porosity is overcome. Accordingly, oil-impregnated sintered bearings that do not produce squealing noises even when used in cold climates are provided.

Specifically, the oil-impregnated sintered bearing disclosed in the Japanese Patent Application Laid-open No. 2003-120674 is made of a sintered alloy having a cross sectional structure in which a Cu alloy phase containing Sn and P and a ferrite phase are mixed in approximately equal amounts by area ratio. The sintered alloy includes not more than 0.7 mass % of graphite particles and includes pores with an open porosity of 20 to 30%. The pores are impregnated with a synthetic oil with a kinetic viscosity of 61.2 to 74.8 mm$^2$/s (cSt) at 40° C. The oil-impregnated sintered bearing is sized and has an inner circumferential surface at which iron portion is exposed at 2 to 6% by area ratio. The oil-impregnated sintered bearing has a fluid permeability of 6 to 50×10$^{-11}$ cm$^2$.

On the other hand, the oil-impregnated sintered bearing disclosed in the Japanese Patent Application Laid-open No. 2005-082867 is produced by compacting and sintering a mixed powder of an iron powder and one of a copper powder and a copper alloy powder. In this method, a part of the amount or the entirety of the iron powder is a porous iron powder. The porous iron powder is made of particles which include numerous microscopic pores from the surface to the inside thereof and thereby have spongelike appearances. The porous iron powder particles have sizes of not greater than 177 μm and pass through a sieve of 80 mesh. The porous iron powder has a specific surface area of 110 to 500 m$^2$/kg as measured by a gas adsorption method.

The oil-impregnated sintered bearings disclosed in the Japanese Patent Applications Laid-open Nos. 2003-120674 and 2005-082867 are suitably used as bearings for blowers of car air-conditioners, for example. In contrast, when these oil-impregnated sintered bearings are used as bearings of window control motors for opening and closing the windows of automobiles, they produce squealing noises even at ordinary temperatures. In regard to the car air-conditioner, when once it is turned on, it may be used continuously for an extended period. Therefore, after the car air-conditioner is started, a sufficient amount of lubricating oil is supplied, and an oil film is reliably formed between a shaft and an inner circumferential surface of the bearing. On the other hand, the window is operated for only a short time and is used intermittently. Therefore, the window is stopped before sufficient amount of lubricating oil is supplied and an oil film is reliably formed between a shaft and an inner circumferential surface of the bearing. Accordingly, the oil film is not sufficiently formed between the shaft and the inner circumferential surface of the bearing at any time.

SUMMARY OF THE INVENTION

The present invention has been completed in view of these circumstances, and an object of the present invention is to provide an oil-impregnated sintered bearing and a production method therefor. The oil-impregnated sintered bearing does not tend to produce squealing noises even when used as a bearing of an electric motor that may be intermittently used for a short time, such as a bearing of a window regulator motor.

The oil-impregnated sintered bearings disclosed in the Japanese Patent Applications Laid-open Nos. 2003-120674 and 2005-082867 include pores of the following two kinds. That is, one kind of the pores is pores that are formed as spaces among the powder particles, which are included in ordinary sintered alloys (hereinafter called "interparticle pores"). The other kind is pores that are formed by the spongelike porous iron powder and that are dispersed within iron phases (iron portions) in the sintered alloy (hereinafter called "microscopic pores"). The interparticle pores are relatively large and greatly affect the fluid permeability of the oil-impregnated sintered bearing. On the other hand, the microscopic pores have a small effect on the fluid permeability of the oil-impregnated sintered bearing because a small number of the microscopic pores communicate with each other, but the other greater number of the microscopic pores do not communicate with each other.

Here, in order to prevent squealing noises from being generated, it is necessary to smoothly slide a shaft on an inner circumferential surface of the bearing without metallic contact. Therefore, it is necessary to prevent metallic contact therebetween by forming a preferable oil film therebetween and holding the shaft with the oil film pressure. Generally, the lubricating oil is smoothly supplied by increasing the fluid permeability of the bearing. However, from the viewpoint of formation of the oil film between the shaft and the inner circumferential surface of the bearing, when the fluid permeability of the bearing is high, the lubricating oil may leak, and a preferable oil film may not be formed.

In view of this, in the inventions disclosed in the Japanese Patent Applications Laid-open Nos. 2003-120674 and 2005-082867, the fluid permeability is decreased by reducing the number of the interparticle pores (6 to $50 \times 10^{-11}$ cm$^2$ in the Japanese Patent Application Laid-open No. 2003-120674), thereby improving capability of forming the oil film. Since the fluid permeability is decreased, the amount of the lubricating oil supplied from the interparticle pores is decreased. Therefore, in the inventions disclosed in the Japanese Patent Applications Laid-open Nos. 2003-120674 and 2005-082867, the microscopic pores are arranged so as to increase the open porosity and increase the oil-retaining characteristics. Thus, the amount of the lubricating oil, which is necessary to form a preferable oil film, is retained in the bearing.

However, the lubricating oil tends to be not sufficiently provided to form a preferable oil film between a shaft and an inner circumferential surface of the bearing. This is because when an electric motor is not run, the lubricating oil impregnated in the microscopic pores within the iron phase of the sintered alloy is decreased in volume and is drawn into the microscopic pores by capillary action. Accordingly, when the electric motor is started, the lubricating oil on the inner circumferential surface of the bearing is insufficient, and metallic contact occurs, which produces squealing noises.

In this regard, the inventors of the present invention focused on the sizes of the interparticle pores, and they conducted intensive research based on the following idea and the number of fine pores and middle-sized pores including interparticle pores and completed the present invention. That is, by arranging interparticle pores with appropriate sizes, lubricating oil may be sufficiently provided at the starting of an electric motor without increasing the fluid permeability of the bearing. Accordingly, a preferable oil film may be formed at the starting of an electric motor.

The present invention is based on the oil-impregnated sintered bearing which has a high open porosity and high oil-retaining characteristics and which is disclosed in the Japanese Patent Application Laid-open No. 2005-082867. The essential feature of the present invention is that middle-sized pores and large-sized pores are used. For the middle-sized pores, interparticle pores with circle-equivalent diameters of greater than 40 μm and not greater than 60 μm (hereinafter called "40 to 60 μm"), and interparticle pores with circle-equivalent diameters of greater than 60 μm and not greater than 80 μm (hereinafter called "60 to 80 μm") are arranged at 0.8 to 3% and at 0.5 to 1.5% with respect to the total number of pores, respectively. For the large-sized pores, interparticle pores with circle-equivalent diameters of greater than 80 μm and not greater than 100 μm (hereinafter called "80 to 100 μm") and interparticle pores with circle-equivalent diameters of greater than 100 μm are formed so as to be not more than 1% and not more than 0.5% with respect to the total number of pores, respectively. By arranging the middle-sized interparticle pores including interparticle pores and controlling the number of the large-sized interparticle pores, pores for supplying the lubricating oil are arranged without increasing the fluid permeability of the bearing. As a result, the lubricating oil is sufficiently supplied at the starting of the electric motor even in cold climates, and a reliable oil film is formed between the shaft and the inner circumferential surface of the bearing.

Figure 1:
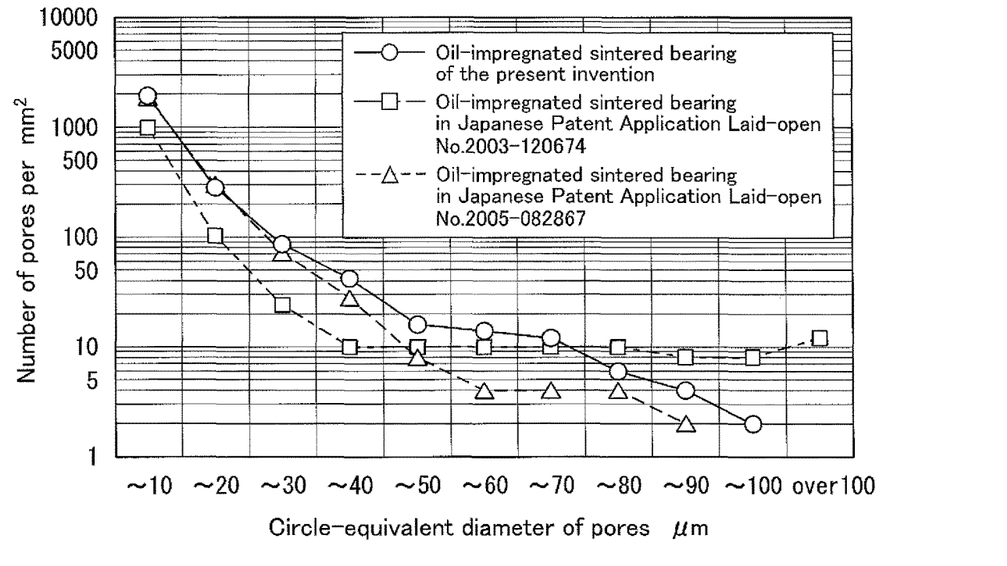
FIG. 1 is a graph that shows pore size distributions of an example of an oil-impregnated sintered bearing of the present invention and conventional oil-impregnated sintered bearings.

The differences of the oil-impregnated sintered bearing of the present invention from the oil-impregnated sintered bearings disclosed in the Japanese Patent Applications Laid-open Nos. 2003-120674 and 2005-082867 are shown in FIG. 1. As shown in FIG. 1, the oil-impregnated sintered bearing in the Japanese Patent Application Laid-open No. 2003-120674 includes a great number of microscopic pores. In this oil-impregnated sintered bearing, the number of pores with circle-equivalent diameters of greater than 90 μm is relatively large, and even pores with circle-equivalent diameters of greater than 100 μm exist. On the other hand, the oil-impregnated sintered bearing in the Japanese Patent Application Laid-open No. 2005-082867 includes a greater number of microscopic pores compared with the oil-impregnated sintered bearing in the Japanese Patent Application Laid-open No. 2003-120674. The oil-impregnated sintered bearing in the Japanese Patent Application Laid-open No. 2005-082867 does not include large pores that have circle-equivalent diameters of greater than 90 μm. In the oil-impregnated sintered bearing of the present invention, the number of microscopic pores is increased as in the case of the Japanese Patent Application Laid-open No. 2005-082867. In addition, the number of large pores with circle-equivalent diameters of greater than 90 μm is decreased, while the large pores with circle-equivalent diameters of greater than 100 μm are not formed, thereby decreasing the fluid permeability. Moreover, middle-sized pores with circle-equivalent diameters of approximately 40 to 80 μm are formed in a predetermined number. Thus, while leakage of the lubricating oil is prevented by not increasing the fluid permeability, the supply of the lubricating oil is performed by the middle-sized pores.

Specifically, the present invention provides an oil-impregnated sintered bearing made of an iron-copper sintered alloy that essentially consists of, by mass %, 10 to 59% of Cu, 0.5 to 3% of Sn, and the balance of Fe and inevitable impurities. The oil-impregnated sintered bearing includes pores in a matrix of the iron-copper sintered alloy at a total of not less than 800 per mm$^2$. The oil-impregnated sintered bearing has an inner circumferential surface at which the pores are exposed at 20 to 50% by area ratio, and it exhibits the following pore size distribution. That is, the number of pores with circle-equivalent diameters of greater than 100 μm is not more than 0.5% with respect to the total number of pores, and the number of pores with circle-equivalent diameters of 80 to 100 μm is not more than 1% with respect to the total number of pores. In addition, the number of pores with circle-equivalent diameters of 60 to 80 μm is 0.5 to 1.5% with respect to the total number of pores. Furthermore, the number of pores with circle-equivalent diameters of 40 to 60 μm is 0.8 to 3% with respect to the total number of pores, and the remainder of the pores are pores with circle-equivalent diameters of not greater than 40 μm.

It is preferable that the oil-impregnated sintered bearing of the present invention further include at least one of Zn and Ni at not more than 5 mass %.

In addition, it is preferable that the oil-impregnated sintered bearing of the present invention include at least one kind of solid lubricant component that is selected from the group consisting of graphite, molybdenum disulfide, manganese sulfide, and calcium fluoride. The solid lubricant component is dispersed in the pores in the matrix of the iron-copper sintered alloy at 0.2 to 2 mass parts with respect to 100 mass parts of the iron-copper sintered alloy.

The present invention also provides a production method for an oil-impregnated sintered bearing having the above pore size distribution, and the production method has the following essential features. That is, as an iron powder, a porous iron powder A with microscopic pores and a porous iron powder B with macroscopic pores are used. The ratio of coarsened powder in the porous iron powder A and the porous iron powder B is increased. The microscopic pores are formed by microscopic pores in the porous iron powder A, and the middle-sized pores are formed by the macroscopic pores and interparticle pores in the porous iron powder B.

Specifically, the production method for the oil-impregnated sintered bearing of the present invention includes preparing a raw powder by mixing an iron powder, a copper powder, and at least one of a tin powder and a copper-tin alloy powder. The method also includes compacting the raw powder into a green compact with a density of 5.5 to 6.8 mg/m$^3$ and with an approximately cylindrical shape and includes sintering the green compact. The raw powder consists of, by mass %, 10 to 59% of Cu, 0.5 to 3% of Sn, and the balance of Fe and inevitable impurities. The iron powder is made of a porous iron powder A and a porous iron powder B. The porous iron powder A includes numerous microscopic pores from the surface to the inside thereof and thereby have spongelike appearances, and has a specific surface area of 110 to 500 m$^2$/kg that is measured by a gas adsorption method. The porous iron powder A has a particle size distribution so as to consist of 14 to 29% of particles larger than 140 sieve mesh, 45 to 64% of particles smaller than 140 sieve mesh and larger than 325 sieve mesh, and particles smaller than 325 sieve mesh as the remainder. The porous iron powder B has a hollow shape with pores on the inside thereof, and has a specific surface area of 80 to 110 m$^2$/kg that is measured by a gas adsorption method. The porous iron powder B has a particle size distribution so as to consist of 0.5 to 5% of particles larger than 90 sieve mesh, 20 to 35% of particles smaller than 90 sieve mesh and larger than 140 sieve mesh, and particles smaller than 140 sieve mesh as the remainder. Particles with pores having a diameter of not less than 50 μm are not less than 80% with respect to the particles larger than 90 sieve mesh, and particles with pores having a diameter of 40 to 60 μm are not less than 60% with respect to the particles smaller than 90 sieve mesh and larger than 140 sieve mesh. The content of the porous iron powder A in the iron powder is 80 to 95%. The tin powder and the copper-tin alloy powder are made of particles smaller than 325 sieve mesh. In addition to the copper in the copper-tin alloy powder, the copper powder made of beaten-copper particles smaller than 100 sieve mesh or the copper powder made of not less than 2 mass % of the beaten-copper particles and the remainder of electrolytic copper particles smaller than 200 sieve mesh may be used. The sintering is performed at a sintering temperature of 760 to 810° C.

It should be noted that particles smaller than nnn sieve mesh are particles that pass through a sieve of nnn mesh, and particles larger than mmm sieve mesh are particles that do not pass through a sieve of mmm mesh. For example, the particles smaller than 240 sieve mesh and larger than 325 sieve mesh pass through a sieve of 240 mesh and do not pass through a sieve of 325 mesh.

In the production method for the oil-impregnated sintered bearing of the present invention, it is preferable that the raw powder be mixed with at least one of a copper-zinc alloy powder and a copper-nickel alloy powder so as to further include at least one of Zn and Ni at not more than 5 mass %.

In addition, in the production method for the oil-impregnated sintered bearing of the present invention, it is preferable that at least one powder of solid lubricant component be added at 0.2 to 2 mass parts with respect to 100 mass parts of the raw powder. The powder of solid lubricant component is selected from the group consisting of a graphite powder, a molybdenum disulfide powder, a manganese sulfide powder, and a calcium fluoride powder.

According to the present invention, an oil-impregnated sintered bearing that does not tend to produce squealing noises is provided. In the oil-impregnated sintered bearing, lubricating oil is sufficiently supplied, and a reliable oil film is formed at the starting of an electric motor. Therefore, the oil-impregnated sintered bearing can be used as a bearing for an electric motor that may be intermittently used for a short time, such as a bearing of a window control motor.

PREFERRED EMBODIMENTS OF THE INVENTION (1) Oil-Impregnated Sintered Bearing (1-1) Composition of Sintered Alloy As the sintered alloy forming the oil-impregnated sintered bearing, an iron-copper sintered alloy is used. The iron-copper sintered alloy consists of, by mass %, 10 to 59% of Cu, 0.5 to 3% of Sn, and the balance of Fe and inevitable impurities. The iron-copper sintered alloy exhibits a metallic structure that is formed of an iron phase, a copper alloy (Cu—Sn alloy) phase, and pores (interparticle pores and microscopic pores).

Fe is added in the form of a porous iron powder, which will be described later. The porous iron powder forms the iron phase and improves strength of the bearing. Due to the porous iron powder, microscopic pores are dispersed within the iron phase, whereby the open porosity is increased, and the oil-retaining characteristics are improved.

Cu forms a soft copper alloy (Cu—Sn) phase and improves adaptability to a shaft and seize resistance. If the amount of Cu is less than 10 mass % in the overall composition, these effects are not sufficiently obtained. On the other hand, if the amount of Cu is greater than 59 mass % in the overall composition, the amount of Fe is decreased, whereby the amount of the iron phase is decreased and the number of the microscopic pores dispersed in the iron phase is decreased. As a result, the open porosity is decreased, and the oil-retaining characteristics are degraded. For these reasons, the amount of Cu is set to be 10 to 59 mass % in the overall composition.

Sn generates a eutectic liquid phase in conjunction with Cu and thereby facilitates the sintering. In addition, Sn alloys with Cu and thereby strengthens the copper alloy phase and improves wear resistance of the copper alloy phase. If the amount of Sn is less than 0.5 mass % in the overall composition, these effects are not sufficiently obtained. On the other hand, if the amount of Sn is more than 3 mass % in the overall composition, the copper alloy phase is hardened too much, and the adaptability to a shaft is decreased. Accordingly, the amount of Sn is set to be 0.5 to 3 mass % in the overall composition.

Zn and Ni strengthen the copper alloy phase and improve the wear resistance of the copper alloy phase, and therefore, at least one of Zn and Ni may be added to the overall composition. In this case, if the amounts of Zn and Ni are excessive, the bearing tends to wear away a shaft easily. Accordingly, in a case of adding at least one of Zn and Ni to the overall composition, they are added so as to be not more than 5 mass %.

(1-2) Area Ratio of Pores

The area ratio of the pores exposed at the inner circumferential surface of the bearing is set to be in a range of 20 to 50%. If the area ratio of the pores exposed at the inner circumferential surface of the bearing is less than 20%, the number of pores is small, and the lubricating effect is not sufficiently obtained. On the other hand, if the area ratio of the pores exposed at the inner circumferential surface of the bearing is greater than 50%, the strength of the oil-impregnated sintered bearing is greatly decreased.

(1-3) Total Number of Pores

If the total number of pores (interparticle pores and microscopic pores) exposed at the inner circumferential surface of the oil-impregnated sintered bearing is too small, the open porosity is decreased. As a result, the oil-retaining characteristics are degraded, and the capability of supplying the lubricating oil is decreased. Therefore, the total number of pores is set to be not less than 800 per mm$^2$.

(1-4) Pore Size Distribution

Most of the pores exposed at the inner circumferential surface of the oil-impregnated sintered bearing are microscopic pores, by which the open porosity is increased and the oil-retaining characteristics are thereby improved. If the interparticle pores are also reduced in size in order to decrease the fluid permeability, the capability of supplying the lubricating oil is decreased, whereby the lubricating oil is not sufficiently supplied, and a preferable oil film is not reliably formed. Therefore, middle-sized pores are arranged so as to increase the capability of supplying the lubricating oil without increasing the fluid permeability, whereby the generation of squealing noises in cold climates is avoided.

The middle-sized pores include pores with circle-equivalent diameters of 60 to 80 μm at 0.5 to 1.5% and pores with circle-equivalent diameters of 40 to 60 μm at 0.8 to 3%, with respect to the total number of pores, respectively. The circle-equivalent diameter is a diameter of a circle that has the same area as an area of one pore. If the number of pores with the circle-equivalent diameters of 40 to 60 μm is less than 0.8% and the number of pores with the circle-equivalent diameters of 60 to 80 μm is less than 0.5%, with respect to the total number of pores, respectively, the number of the middle-sized pores is insufficient. Therefore, the capability of supplying the lubricating oil is not improved. On the other hand, if the number of pores with the circle-equivalent diameters of 40 to 60 μm is more than 3% and the number of pores with the circle-equivalent diameters of 60 to 80 μm is more than 1.5%, with respect to the total number of pores, respectively, the number of intercommunicating pores is increased. Therefore, the fluid permeability of the oil-impregnated sintered bearing is increased, the lubricating oil leaks, and the noise level is undesirably increased.

Even when the middle-sized pores are so arranged, if large pores exist, the fluid permeability of the oil-impregnated sintered bearing is increased. Therefore, the number of large pores with circle-equivalent diameters of greater than 80 μm and less than 100 μm is not more than 1% of the total number of pores, and the number of large pores with circle-equivalent diameters of greater than 100 μm is not more than 0.5% of the total number of pores.

As for the remainder of the total number of pores, pores with circle-equivalent diameters of not greater than 40 μm are formed, which improves the oil-retaining characteristics of the oil-impregnated sintered bearing.

(1-5) Fluid Permeability

The fluid permeability of the oil-impregnated sintered bearing is closely related to sliding noises. The relationship between the fluid permeability and noise level is approximated by a quadratic function, and if the fluid permeability is high, the noise level is also high. Therefore, it is preferable that the fluid permeability of the oil-impregnated sintered bearing be set to be not more than $30 \times 10^{-11}$ cm$^2$. Meanwhile, the fluid permeability of the oil-impregnated sintered bearing affects the capability of supplying the lubricating oil. If the fluid permeability is less than $1 \times 10^{-11}$ cm$^2$, the lubricating oil is not smoothly supplied, whereby preferable sliding characteristics are not obtained. Accordingly, it is preferable that the fluid permeability of the oil-impregnated sintered bearing be set to be 1 to $30 \times 10^{-11}$ cm$^2$.

(2) Production Method for Oil-Impregnated Sintered Bearing (2-1) Raw Powder

A mixed powder is used for the raw powder and is obtained by mixing a copper powder, and at least one of a tin powder and a copper-tin alloy powder, with a porous iron powder. The porous iron powder has particles that include numerous microscopic pores and have spongelike appearances.

(2-2) Porous Iron Powder A

The porous iron powder is made of two iron powders. One kind of the iron powders is a porous iron powder disclosed in Japanese Patent Application Laid-open No. 2005-082867. That is, the porous iron powder A includes numerous microscopic pores from the surface to the inside thereof and thereby have spongelike appearances, and has a specific surface area of 110 to 500 m$^2$/kg that is measured by the gas adsorption method (BET method, ISO 9277). Microscopic pores of an oil-impregnated sintered bearing are formed by microscopic pores in the porous iron powder A. If the specific surface area is less than 110 m$^2$/kg as measured by the gas adsorption method, the iron powder particles include a small number of microscopic pores. Therefore, a sintered alloy that is obtained by using this iron powder includes an iron phase with a small number of microscopic pores, whereby the oil-retaining characteristics of an oil-impregnated sintered bearing are greatly decreased. On the other hand, if the specific surface area is greater than 500 m$^2$/kg, the iron powder tends to include a great number of fine particles. In this case, the interparticle pores are easily formed as closed pores, whereby the capability of supplying the lubricating oil is greatly degraded. For the porous iron powder A preferably used in the present invention, for example, "LD80" (specific surface area is approximately 200 m$^2$/kg), "P100" (specific surface area is approximately 175 m$^2$/kg), and "R12" (specific surface area is approximately 225 m$^2$/kg), which are manufactured by Höganäs AB, may be used.

When it is made of only fine powder, it is difficult to effectively form the microscopic pores of the iron phase by such a porous iron powder A. In contrast, when it is made of only coarse powder, bridging of particles of the coarse powder is generated, and as a result, large interparticle pores are formed, and the fluid permeability of the oil-impregnated sintered bearing is increased. Therefore, it is necessary that the porous iron powder A have a particle size distribution in which the larger-sized powder is contained at a suitable amount. From this viewpoint, the porous iron powder A has a particle size distribution so as to consist of 14 to 29% of particles larger than 140 sieve mesh, 45 to 64% of particles smaller than 140 sieve mesh and larger than 325 sieve mesh, and particles smaller than 325 sieve mesh as the remainder. When any value in the particle size distribution is deviated from, it becomes difficult to obtain the above microscopic pores. As described above, since the coarse powder is a generating factor of the bridging, it is preferable that an amount of the powder larger than 80 sieve mesh be less than 1%.

(2-3) Porous Iron Powder B

In the case in which only the above porous iron powder A is used as an iron powder, the middle-sized pores are only interparticle pores in which the clearance between molded raw powders is formed after sintering. The number of the middle-sized pores is small and the fluid permeability is decreased, and as a result, the capability of supplying the lubricating oil is decreased. Therefore, using the porous iron powder B having a hollow shape with pores on the inside thereof and having a specific surface area of 80 to 110 m$^2$/kg that is measured by a gas adsorption method, the middle-sized pores of the oil-impregnated sintered bearing is formed by the larger-sized pores which exist on the inside of this porous iron powder B.

When the specific surface area measured by a gas adsorption method is less than 80 m$^2$/kg, the number of the larger-sized pores in the iron powder is small and the number of the middle-sized pores in the sintered alloy obtained by this iron powder is decreased, and as a result, the fluid permeability is decreased. In contrast, when the specific surface area measured by a gas adsorption method is more than 110 m$^2$/kg, the number of the larger-sized pores is decreased by increasing the microscopic pores, and the fluid permeability is decreased. Here, the larger-sized pores on the inside of the porous iron powder B are formed as a open pore in which a part thereof is in communication with the surface of the porous iron powder B. As the above porous iron powder B, for example, a powder with the trade name DHC-250 (specific surface area about 100 m$^2$/kg) produced by DOWA IP Creation Co., Ltd., can be used.

It is necessary that the middle-sized pores be formed by the larger-sized pores which exist on the inside of the above porous iron powder B. When it is made of only the fine powder, it is difficult to form the middle-sized pores. In contrast, when it is made of only the coarse powder, the bridging of particles of the coarse powder is generated, large interparticle pores are formed, and the fluid permeability of the oil-impregnated sintered bearing is increased. Thus, it is necessary that the porous iron powder B also have a particle size distribution in which the lager-sized powder is contained at a suitable amount.

Therefore, the porous iron powder B has a particle size distribution so as to consist of 0.5 to 5% of particles larger than 90 sieve mesh, 20 to 35% of particles smaller than 90 sieve mesh and larger than 140 sieve mesh, and particles smaller than 140 sieve mesh as the remainder. In addition, particles with pores having a diameter of not less than 50 µm are not less than 80% with respect to the particles larger than 90 sieve mesh, and particles with pores having a diameter of 40 to 60 µm are not less than 60% with respect to the particles smaller than 90 sieve mesh and larger than 140 sieve mesh. As described above, the middle-sized pores in the sintered alloy obtained after sintering can be adjusted within the above range by constituting the porous iron powder B. When any value in the particle size distribution and the size of the pores contained in the powder is deviated from, it becomes difficult to obtain the above middle-sized pores.

Here, in the porous iron powder B similar to the porous iron powder A, coarse powder such as powder larger than 80 sieve mesh is a factor for generating the bridging. Therefore, it is preferable that powder larger than 80 sieve mesh be less than 1%.

(2-4) Ratio of Porous Iron Powder A and Porous Iron Powder B

When the amount of the porous iron powder A is not more than 80% with respect to the entire iron powder (total amount of the porous iron powder A and the porous iron powder B), the number of the microscopic pores is decreased, and the oil-retaining characteristics are degraded. In contrast, when the amount of the porous iron powder A is more than 95% with respect to the entire iron powder, the number of the middle-sized pores is decreased, and the fluid permeability is decreased. As a result, the capability of supplying the lubricating oil is decreased. Therefore, the amount of the porous iron powder A is set to be 80 to 95% with respect to the entire iron powder, and a mixture in which the porous iron powder A and the porous iron powder B are added in this range is used as an iron powder.

(2-5) Copper Powder

The amount of Cu is set to be 10 to 59 mass % in the raw powder. The reasons for limiting the amount of Cu are the same as those for the amount of Cu in the overall composition. Cu is added to the raw powder in the form of a copper powder at a predetermined amount other than the amount of Cu of a copper-tin alloy powder, which will be described later.

The entire amount of the copper powder may be added in the form of a beaten-copper powder. When the copper powder is added in the form of the beaten-copper powder, the beaten-copper powder particles are arranged around the porous iron powder particles. Therefore, the amount of copper exposed at the inner circumferential surface of the bearing is increased for the amount, and the fluid permeability is decreased by blocking intercommunicating pores that exist in small amount within the porous iron powder particles. On the other hand, the beaten-copper powder is more expensive than an electrolytic copper powder that is generally used. Accordingly, when a large amount of the copper powder is used, a part of the amount of the copper powder is preferably added in the form of the electrolytic copper powder in view of the cost. Even in this case, since the beaten-copper powder provides the above effects, the beaten-copper powder is preferably added in the raw powder at at least 2 mass %.

A part of the amount of the copper powder reacts with Sn and generates a Cu—Sn eutectic liquid phase, thereby facilitating the sintering. If a copper powder including large particles is used, large melt-off pores are formed due to outflow of the copper powder, and the fluid permeability may be increased. Therefore, a beaten-copper powder made of particles smaller than 100 sieve mesh is used. In a case of adding an electrolytic copper powder, an electrolytic copper powder made of particles smaller than 200 sieve mesh is used.

(2-6) At Least One of Tin Powder and Copper-Tin Alloy Powder

Sn is added in the form of a powder of at least one of a tin powder and a copper-tin alloy powder. Since the amount of Sn is 0.5 to 3 mass % in the overall composition, at least one of the tin powder and the copper-tin alloy powder is added so that the amount of Sn is 0.5 to 3 mass % in the raw powder.

Sn generates the Cu—Sn eutectic liquid phase and thereby facilitates the sintering, and Sn alloys with Cu and thereby strengthens the copper alloy phase and improves the wear resistance of the copper alloy phase. In order to uniformly provide these effects in the sintered alloy, fine powder particles smaller than 325 sieve mesh are used for the tin powder and the copper-tin alloy powder. In the present invention, the middle-sized interparticle pores are formed by the copper-phosphorus alloy powder. However, if the tin powder and the copper-tin alloy powder have larger sizes, middle-sized interparticle pores are also formed by melt-off pores due to outflows of these powders, whereby it is difficult to control the pore size distribution. In view of this, as described above, the fine powder particles smaller than 325 sieve mesh are used for the tin powder and the copper-tin alloy powder.

When the copper-tin alloy powder is used, since it is necessary to generate a liquid phase at a sintering temperature, it is preferable that a copper-tin alloy powder including not less than 50 mass % of Sn be used.

In the case of adding at least one of Zn and Ni to the composition of the sintered alloy, Zn and Ni are added in the form of copper alloy powders. This is because Zn easily vaporizes in the sintering when added in the form of a single powder, and Ni is not easily diffused to the copper alloy phase when added in the form of a single powder. As described above, in the case of adding at least one of Zn and Ni, they are added so as to be not more than 5 mass % in the overall composition. Therefore, a copper-zinc alloy powder and a copper-nickel alloy powder are added so that the amounts of Zn and Ni are not more than 5 mass % in the composition of the raw powder. When at least one of these copper alloy powders is used, the amount of the copper powder must be adjusted according to the amount of Cu included in these copper alloy powders.

(2-7) Compacting

The raw powder is compacted by a die assembly and is formed into a green compact with an approximately cylindrical shape, as in the case of a production of an ordinary oil-impregnated sintered bearing. The die assembly includes a die, an upper punch, a lower punch, and a core rod. The die has a hole for forming an outer circumferential shape of the green compact. The upper punch forms an upper end surface of the green compact. The lower punch forms a lower end surface of the green compact. The core rod forms an inner circumferential shape of the green compact. The die, the lower punch, and the core rod form a die cavity. The raw powder is filled into the die cavity and is compacted by the upper punch and the lower punch so as to have a compact density of 5.5 to 6.8 $Mg/m^3$, which is similar to that of an ordinary oil-impregnated sintered bearing. In the present invention, the raw powder includes the porous iron powder as the iron powder, which has lower apparent density than that of an ordinary atomized iron powder. Therefore, smaller spaces are formed among the powder particles compared with the spaces among the powder particles of a green compact for an ordinary oil-impregnated sintered bearing.

(2-8) Sintering

The green compact is heated and is sintered in a non-oxidizing atmosphere as in the case of the production of an ordinary oil-impregnated sintered bearing. If the sintering temperature is less than 760° C., the sintering reaction does not sufficiently proceed, whereby the strength of the sintered compact is decreased. On the other hand, if the sintering temperature is greater than 810° C., the Cu—Sn eutectic liquid phase is excessively generated. As a result, the Cu—Sn eutectic liquid phase infiltrates the interparticle pores that are formed by the copper-phosphorus alloy powder, whereby a predetermined pore size distribution is difficult to obtain. Therefore, the sintering is performed at a sintering temperature of 760 to 810° C.

(3) Other Embodiments

As in the case of a conventional oil-impregnated sintered bearing, at least one kind of solid lubricant component may be added in the above oil-impregnated sintered bearing. The solid lubricant component may be selected from the group consisting of graphite, molybdenum disulfide, manganese sulfide, and calcium fluoride. When these solid lubricant components are used, frictional coefficient between a shaft and the oil-impregnated sintered bearing during sliding is decreased. These solid lubricant components do not react with the iron phase and the copper alloy phase of the sintered alloy and disperse into the interparticle pores. In this case, if the total amount thereof is less than 0.2 mass parts with respect to 100 mass parts of the iron-copper sintered alloy, the effects are small. On the other hand, if the total amount of these solid lubricant components is greater than 2 mass parts, the strength of the bearing is greatly decreased. Therefore, in the case of using the solid lubricant components, the total amount thereof is set to be 0.2 to 2 mass parts with respect to 100 mass parts of the iron-copper sintered alloy. In this case, powders of solid lubricant components are added at a total of 0.2 to 2 mass parts with respect to 100 mass parts of the raw powder.

In the production method for the oil-impregnated sintered bearing, as in the case of a conventional oil-impregnated sintered bearing, the sintered compact may be subjected to a recompressing treatment for correcting the dimensions of the bearing, such as sizing, after the sintering. In addition, the sintered compact may be subjected to a recompressing treatment for providing a taper to the inner circumferential surface of the bearing, such as is disclosed in Japanese Examined Patent Publication No. 63-067047.

EXAMPLES

1. First Example

The following powders (1) to (5) were prepared for raw powders.
(1) Porous iron powder A: specific surface area was 200 $m^2/kg$, particle size distribution consisted of 19.2% of particles larger than 90 sieve mesh, 54.7% of particles smaller than 140 sieve mesh and larger than 325 sieve mesh, and 26.1% of particles smaller than 325 sieve mesh
(2) Porous iron powder B: specific surface area was 100 $m^2/kg$, particle size distribution consisted of 2.8% of particles larger than 90 sieve mesh, 24.3% of particles smaller than 90 sieve mesh and larger than 145 sieve mesh, and 72.9% of particles smaller than 140 sieve mesh
(3) Electrolytic copper powder: particles smaller than 145 sieve mesh and larger than 350 sieve mesh were included at 80 to 90 mass %
(4) Beaten-copper powder: particles smaller than 100 sieve mesh and larger than 350 sieve mesh were included at 35 to 55 mass %
(5) Tin powder: particle sizes were smaller than 325 sieve mesh The iron powder was prepared by adding the porous iron powder A and the porous iron powder B at various mixing ratios shown in Table 1. 5 mass % of the electrolytic copper powder, 6 mass % of the beaten-copper powder, and 1 mass % of the tin powder, were added to this iron powder, whereby mixed powders were obtained. Moreover, the mixed powders were mixed with 0.5 mass parts of a zinc stearate powder of a forming lubricant with respect to 100 mass parts of the mixed powder, whereby raw powders were prepared.

The raw powders were compacted into green compacts with a compact density of 6.6 mg/m², and the green compacts were heated to 790° C. and were sintered in a decomposed ammonia gas atmosphere, whereby cylindrical sintered compacts were formed. The sintered compacts had an outer diameter of 10.30 mm, an inner diameter of 7.31 mm, and a height of 6.63 mm. The cylindrical sintered compacts were recompressed at the same pressure by a recompression die assembly having the same shape, as those used in the above compacting step, so as to have an outer diameter of 10.22 mm, an inner diameter of 7.32 mm, and a height of 6.50 mm. Thus, sintered compact samples of samples Nos. 01 to 06 were formed.

Each of the sintered compact samples was cut in the axial direction, and the inner circumferential surface thereof was observed by an optical microscope. Meanwhile, the area of pores, the total number of pores, the circle-equivalent diameter of each pore, and the pore size distribution, were measured by image analyzing software ("Quick Grain Standard Video" manufactured by Inotech Co., Ltd.). In addition, ratios of the amounts of pores that were classified into four sizes shown in Table 1 to the total number of pores were investigated. These results are also shown in Table 1.

The sintered compact samples were vacuum impregnated with a lubricating oil "ANDEROL® 465" manufactured by ANDEROL JAPAN Inc.), and samples of oil-impregnated sintered bearings were formed. Each of the samples of oil-impregnated sintered bearings was mounted as a bearing for a shaft in an electric motor, and frictional coefficient was measured by driving the electric motor at room temperature (25° C.). The results of the frictional coefficient measurement are also shown in Table 1. The electric motor had a shaft with a diameter of 7.29 mm and a PV factor of 110 MPa·m/min and was driven at a sliding rate of 101 m/min. In the evaluation, it was judged that a sample having a friction coefficient of not more than 0.15 was superior.

bearings of the sample No. 01 in which the ratio of the porous iron powder A for forming the microscopic pores was less than 80%, the total number of pores was less than 800 per mm², and therefore, oil-retaining characteristics were low. In addition, in the sample of the oil-impregnated sintered bearings of the sample No. 01, the area ratio of the pores on an inner circumferential surface of the bearing was more than 50%, and the amount of the porous iron powder B for forming the middle-sized pores was exceeded. As a result, the fluid permeability was high, so that the ratio of pores with circle-equivalent diameters of greater than 100 μm was more than 0.5%, the ratio of pores with circle-equivalent diameters of greater than 80 μm and not greater than 100 μm was more than 1%, the ratio of pores with circle-equivalent diameters of greater than 60 μm and not greater than 80 μm was more than 1.5%, and the ratio of pores with circle-equivalent diameters of greater than 40 μm and not greater than 60 μm was more than 3%. Therefore, fluid permeability was excessively high and lubricating oil leaked, whereby the friction coefficient was 0.17 due to metallic contacts.

In contrast, in the sample of the oil-impregnated sintered bearings of the sample No. 02 in which the ratio of the porous iron powder A was 80%, the oil-retaining characteristics were sufficiently increased by increasing the total number of pores to 800 per mm². In addition, the area ratio of the pores was decreased to 50%, and the ratio of pores with circle-equivalent diameters of greater than 100 μm was decreased to 0.5%, the ratio of pores with circle-equivalent diameters of greater than 80 μm and not greater than 100 μm was decreased to 1%, the ratio of pores with circle-equivalent diameters of greater than 60 μm and not greater than 80 μm was decreased to 1.5%, and the ratio of pores with circle-equivalent diameters of greater than 40 μm and not greater than 60 μm was decreased to 3%, respectively. The fluid permeability was sufficiently decreased and lubricating oil was prevented from leaking. Therefore, the metallic contact between a shaft and an inner circumferential surface of the bearing was controlled so that the friction coefficient was 0.13. When the mixing ratio of the porous iron powder A was more than 80%, the oil-retaining characteristics were increased by increasing the total number of pores, and fluid permeability was decreased by decreasing the area ratio of the pores and the number of pores having a diameter of greater than 40 μm, respectively. As a result, in the samples of the oil-impregnated sintered bearings of the samples Nos.

TABLE 1

| | Ratio of iron powder mass % | | | | Ratio of amount of pores to total number of pores % | | | | | |
|---|---|---|---|---|---|---|---|---|---|---|
| No. | Porous iron powder A | Porous iron powder B | Area ratio of pores % | Total number of pores/mm² | more than 100 μm | more than 80 μm and not more than 100 μm | more than 60 μm and not more than 80 μm | more than 40 μm and not more than 60 μm | not more than 40 μm | Friction coefficient |
| 01 | 75 | 25 | 53 | 600 | 0.6 | 1.1 | 1.6 | 3.2 | 93.5 | 0.17 |
| 02 | 80 | 20 | 50 | 800 | 0.5 | 1.0 | 1.5 | 3.0 | 94.0 | 0.13 |
| 03 | 85 | 15 | 38 | 1570 | 0.3 | 0.7 | 1.1 | 2.1 | 95.8 | 0.12 |
| 04 | 90 | 10 | 26 | 2340 | 0.0 | 0.3 | 0.8 | 1.3 | 97.6 | 0.11 |
| 05 | 95 | 5 | 20 | 2720 | 0.0 | 0.1 | 0.5 | 0.8 | 98.6 | 0.13 |
| 06 | 98 | 2 | 17 | 2810 | 0.0 | 0.0 | 0.4 | 0.6 | 99.0 | 0.15 |

According to the results of the samples Nos. 01 to 06 in Table 1, shapes of pores were controlled by changing the mixing ratio of the porous iron powder A and the porous iron powder B. In the sample of the oil-impregnated sintered bearings of the sample 03 and 04 in which the ratio of the porous iron powder A was 85 to 90%, the oil-retaining characteristics and the fluid permeability were optimally balanced and the friction coefficient was decreased so that the lowest value was 0.11.

However, when the fluid permeability was decreased by decreasing the number of pores having a diameter of greater than 40 the lubricating oil was prevented from leaking, but the capability of supplying the lubricating oil was conversely decreased. Therefore, when the ratio of the porous iron powder A was increased to more than 90%, the fluid permeability was excessively decreased and the capability of supplying the lubricating oil was decreased, and as a result, the friction coefficient was increased. Then, in the sample of the oil-impregnated sintered bearings of the sample No. 06 in which the ratio of the porous iron powder A was more than 95%, the area ratio of the pores was less than 20%, the number of pores with circle-equivalent diameters of greater than 60 μm and not greater than 80 μm was less than 0.5%, the number of pores with circle-equivalent diameters of greater than 40 μm and not greater than 60 μm was less than 0.8%, the capability of supplying the lubricating oil was decreased, and therefore, the friction coefficient was increased to 0.15.

As described above, it was confirmed that the shape of the pores could be controlled by adding the porous iron powder B to the porous iron powder A. Additionally, it was confirmed that the frictional coefficient could be controlled so that the area ratio of the pores was 20 to 50%, the total number of pores was not less than 800 per mm$^2$, the number mixed at ratios shown in Table 2, and porous iron powders A having different particle size distributions were formed. In Tables 2 to 4 and 6, the symbol "−#mm" represents particles smaller than nnn sieve mesh, and the symbol "+#mmm" represents particles larger than mmm sieve mesh. Next, 8.8 mass % (an amount of the porous iron powder was 60% of the iron powder) of the porous iron powder B prepared in the First Example, 5 mass % of the electrolytic copper powder, 6 mass % of the beaten-copper powder, and 1 mass % of the tin powder, were added to these porous iron powders A, whereby raw powders were obtained. These raw powders were compacted and sintered, as in the case of the First Example, whereby sintered compact samples of samples Nos. 07 to 10 were formed.

In these sintered compact samples, the area ratio of pores, the total number of pores, and the ratios of the amounts of the pores that were classified into four sizes to the total number of pores were investigated as in the case of the First Example. These results are shown in Table 2. Moreover, in these sintered compact samples, frictional coefficient at low temperature was measured as in the case of the First Example. The measured results of the frictional coefficients are also shown in Table 2. The values of the sample of the sample No. 04 in the First Example are also shown in Table 2.

TABLE 2

| | Particle size distribution in porous iron powder A % | | | Area ratio of pores % | Total number of pores/mm$^2$ | Ratio of amount of pores to total number of pores % | | | | | Friction coefficient |
|---|---|---|---|---|---|---|---|---|---|---|---|
| No. | +#140 | −#140 +#325 | −#325 | | | more than 100 μm | more than 80 μm and not more than 100 μm | more than 60 μm and not more than 80 μm | more than 40 μm and not more than 60 μm | not more than 40 μm | |
| 07 | 10.0 | 40.0 | 50.0 | 29 | 2130 | 0.0 | 0.0 | 0.4 | 0.3 | 99.3 | 0.15 |
| 08 | 14.0 | 45.0 | 41.0 | 28 | 2200 | 0.0 | 0.1 | 0.6 | 0.8 | 98.5 | 0.13 |
| 04 | 19.2 | 54.7 | 26.1 | 26 | 2340 | 0.0 | 0.3 | 0.8 | 1.3 | 97.6 | 0.11 |
| 09 | 29.0 | 64.0 | 7.0 | 24 | 2480 | 0.4 | 0.7 | 1.3 | 2.4 | 95.2 | 0.12 |
| 10 | 35.0 | 65.0 | 0.0 | 23 | 2580 | 0.6 | 1.1 | 1.6 | 3.1 | 93.6 | 0.15 | of pores with circle-equivalent diameters of greater than 100 μm was not more than 0.5% with respect to the total number of pores, the number of pores with circle-equivalent diameters of 80 to 100 μm was not more than 1% with respect to the total number of pores, the number of pores with circle-equivalent diameters of 60 to 80 μm was in a range of 0.5 to 1.5% with respect to the total number of pores, and the number of pores with circle-equivalent diameters of greater than 40 μm and not greater than 60 μm was in a range of 0.8 to 3% with respect to the total number of pores. Furthermore, it was confirmed that the mixing ratio of the porous iron powder A was set to be in a range of 80 to 95% in order to form such shapes of the pores.

2. Second Example

The porous iron powder A prepared in the First Example was classified into three classes by using a sieve of 140 mesh and a sieve of 325 mesh. Then, particles larger than 140 sieve mesh, particles smaller than 140 sieve mesh and larger than 325 sieve mesh, and particles smaller than 325 sieve mesh, were obtained. These three kinds of particles were According to the results of the samples Nos. 04, 07 to 10 in Table 2, shapes of pores were controlled by changing the particle size distribution of the porous iron powder A. In the sample of the oil-impregnated sintered bearings of the sample No. 07, the powder larger than 140 sieve mesh and the powder smaller than 140 sieve mesh and larger than 325 sieve mesh were less than 14% and 45%, respectively. The interparticle pores were small since an amount of the powder smaller than 325 sieve mesh was large. In addition, the number of pores with circle-equivalent diameters of greater than 60 μm and not greater than 80 μm and the pores with circle-equivalent diameters of greater than 40 μm and not greater than 60 μm were small and the fluid permeability was low, whereby the capability of supplying the lubricating oil was low and the friction coefficient was 0.15.

On the other hand, in the sample of the oil-impregnated sintered bearings of the sample No. 08 in which the powder larger than 140 sieve mesh was 14% and the powder smaller than 140 sieve mesh and larger than 325 sieve mesh was 45%, the interparticle pores were formed at a suitable ratio. In addition, the number of pores with circle-equivalent diameters of greater than 60 μm and not greater than 80 μm was 0.6% and the pores with circle-equivalent diameters of greater than 40 μm and not greater than 60 μm was 0.8%. Furthermore, the fluid permeability was increased, and the capability of supplying the lubricating oil was improved, whereby the friction coefficient was decreased to 0.15. Additionally, many interparticle pores were formed as the numbers of the powder larger than 140 sieve mesh and the powder smaller than 140 sieve mesh and larger than 325 sieve mesh were increased, and the number of pores with circle-equivalent diameters of greater than 40 μm was increased. Therefore, in the sample of the oil-impregnated sintered bearings of the sample No. 04 in which the powder larger than 140 sieve mesh was more than 14% and the powder smaller than 140 sieve mesh and larger than 325 sieve mesh was more than 45%, the fluid permeability was suitably increased, and the capability of supplying the lubricating oil was increased, whereby the friction coefficient was further decreased to 0.11.

However, when the number of pores with circle-equivalent diameters of greater than 40 μm was increased, the lubricating oil was easily leaked from these pores. As a result, in the sample of the oil-impregnated sintered bearings of the sample No. 09 in which the powder larger than 140 sieve mesh was 29% and the powder smaller than 140 sieve mesh and larger than 325 sieve mesh was 64%, the friction coefficient was conversely increased. In addition, in the sample of the oil-impregnated sintered bearings of the a sieve of 140 mesh. Then, particles larger than 90 sieve mesh, particles smaller than 90 sieve mesh and larger than 140 sieve mesh, and particles smaller than 140 sieve mesh, were obtained. These three kinds of particles were mixed at ratios shown in Table 3, and porous iron powders B having different particle size distributions were formed. Next, 8.8 mass % (an amount of the porous iron powder A was 60% of the iron powder) of these porous iron powders B, 5 mass % of the electrolytic copper powder, 6 mass % of the beaten-copper powder, and 1 mass % of the tin powder, used in the First Example, were added to the porous iron powder A used in First Example, whereby raw powders were obtained. These raw powders were compacted and sintered, as in the case of the First Example, whereby sintered compact samples of samples Nos. 11 to 14 were formed.

In these sintered compact samples, the area ratio of pores, the total number of pores, and the ratios of the amounts of pores that were classified into four sizes to the total number of pores were investigated as in the case of the First Example. These results are shown in Table 3. Moreover, in these sintered compact samples, frictional coefficients at low temperature were measured as in the case of the First Example. The measured results of the frictional coefficients are also shown in Table 3. The values of the sample of the sample No. 04 in the First Example are also shown in Table 3.

TABLE 3

| | Particle size distribution in porous iron powder B % | | | | | Ratio of amount of pores to total number of pores % | | | | | |
| --- | --- | --- | --- | --- | --- | --- | --- | --- | --- | --- | --- |
| No. | +#90 | −#90 +#140 | −#140 | Area ratio of pores % | Total number of pores/mm² | more than 100 μm | more than 80 μm and not more than 100 μm | more than 60 μm and not more than 80 μm | more than 40 μm and not more than 60 μm | not more than 40 μm | Friction coefficient |
| 11 | 0.0 | 15.0 | 85.0 | 24 | 2430 | 0.0 | 0.0 | 0.4 | 0.6 | 99.0 | 0.16 |
| 12 | 0.5 | 20.0 | 79.5 | 25 | 2380 | 0.0 | 0.1 | 0.5 | 0.8 | 98.6 | 0.13 |
| 04 | 2.8 | 24.3 | 72.9 | 26 | 2340 | 0.0 | 0.3 | 0.8 | 1.3 | 97.6 | 0.11 |
| 13 | 5.0 | 35.0 | 60.0 | 27 | 2320 | 0.5 | 0.9 | 1.4 | 2.2 | 95.0 | 0.13 |
| 14 | 5.5 | 40.0 | 54.5 | 28 | 2300 | 0.6 | 1.1 | 1.6 | 3.1 | 93.6 | 0.16 | sample No. 10 in which the powder larger than 140 sieve mesh was more than 29% and the powder smaller than 140 sieve mesh and larger than 325 sieve mesh was more than 64%, the number of pores with circle-equivalent diameters of greater than 100 μm was more than 0.5%, the number of pores with circle-equivalent diameters of 80 to 100 μm was more than 1%, the number of pores with circle-equivalent diameters of 40 to 60 μm was more than 3%, and the lubricating oil leaked to a substantial degree, whereby the friction coefficient was increased to 0.15.

As described above, it was confirmed that the porous iron powder A had a particle size distribution so as to consist of 14 to 29% of particles larger than 140 sieve mesh, 45 to 64% of particles smaller than 140 sieve mesh and larger than 325 sieve mesh, and particles smaller than 325 sieve mesh as the remainder.

3. Third Example

The porous iron powder B prepared in First Example was classified into three classes by using a sieve of 90 mesh and According to the results of the samples Nos. 04 and 11 to 16 in Table 3, shapes of pores were controlled by changing the particle size distribution of the porous iron powder B. In the sample of the oil-impregnated sintered bearings of the sample No. 11, the powder larger than 90 sieve mesh and the powder smaller than 90 sieve mesh and larger than 140 sieve mesh were less than 0.5% and 20%, respectively. The interparticle pores were small since an amount of the powder smaller than 140 sieve mesh was large, and most of pores formed by a hollow shape of the inside of the porous iron powder B was small. Therefore, the number of pores with circle-equivalent diameters of greater than 60 μm and not greater than 80 μm and the pores with circle-equivalent diameters of greater than 40 μm and not greater than 60 μm were small and the fluid permeability was low, whereby the capability of supplying the lubricating oil was low and the friction coefficient was 0.16.

On the other hand, in the sample of the oil-impregnated sintered bearings of the sample No. 12 in which the powder larger than 90 sieve mesh was 0.5% and the powder smaller than 90 sieve mesh and larger than 140 sieve mesh was 20%, the interparticle pores were formed at a suitable ratio, and the pores having larger size, formed by a hollow shape of the inside of the porous iron powder B were increased. In addition, the number of pores with circle-equivalent diameters of greater than 40 μm was sufficiently increased. Furthermore, the fluid permeability was suitably increased, and the capability of supplying the lubricating oil was improved, whereby the friction coefficient was decreased to 0.15. Additionally, large interparticle pores were formed as the numbers of the powder larger than 90 sieve mesh and the powder smaller than 90 sieve mesh and larger than 140 sieve mesh were increased, and the number of the middle-sized pores formed by a hollow shape of the inside of the porous iron powder B was increased, whereby the number of pores with circle-equivalent diameters of not smaller than 40 μm was increased. Therefore, in the sample of the oil-impregnated sintered bearings of the sample No. 04, the friction coefficient was further decreased as the powder larger than 90 sieve mesh and the powder smaller than 90 sieve mesh and larger than 140 sieve mesh were increased.

However, when the amount of the powder larger than 90 sieve mesh or the powder smaller than 90 sieve mesh and larger than 140 sieve mesh was excessively high, the number of the middle-sized pores formed by a hollow shape of the inside of the porous iron powder B was too large, whereby the lubricating oil easily leaked. Therefore, in the sample of the oil-impregnated sintered bearings of the sample No. 14 in which the powder larger than 90 sieve mesh was more than 5% and the powder smaller than 90 sieve mesh and larger than 140 sieve mesh was more than 35%, the number of pores with circle-equivalent diameters of greater than 100 μm was more than 0.5%, the number of pores with circle-equivalent diameters of 80 to 100 μm was more than 1%, the number of pores with circle-equivalent diameters of 40 to 60 μm was more than 3%, and the lubricating oil leaked to a substantial degree, whereby the friction coefficient was increased to 0.16.

As described above, it was confirmed that the porous iron powder B had a particle size distribution so as to consist of 0.5 to 5% of particles larger than 90 sieve mesh, 20 to 35% of particles smaller than 90 sieve mesh and larger than 140 sieve mesh, and particles smaller than 140 sieve mesh as the remainder.

4. Fourth Example

Atomized iron powder (solid, that is, there were no pores on the inside thereof) was classified by using a sieve of 90 mesh, whereby particles larger than 90 sieve mesh were prepared. A porous iron powder B in which the solid atomized iron powders were substituted for a part of the particles larger than 90 sieve mesh was produced by adding this classified atomized iron powder to the porous iron powder B classified in the Third Example at the mixing ratios shown in Table 4. Then, 8.8 mass % (an amount of the porous iron powder A was 90% of the iron powder) of this porous iron powder B, 5 mass % of the electrolytic copper powder, 6 mass % of the beaten-copper powder, and 1 mass % of the tin powder, used in the First Example, were added to the porous iron powder A used in First Example, whereby raw powders were obtained. These raw powders were compacted and sintered, as in the case of the First Example, whereby sintered compact samples of samples Nos. 15 to 17 were formed.

In these sintered compact samples, the area ratio of pores, the total number of pores, and the ratios of the amounts of the pores that were classified into four sizes to the total number of pores were investigated as in the case of the First Example. These results are shown in Table 5. Moreover, in these sintered compact samples, frictional coefficients were measured as in the case of the First Example. The measured results of the frictional coefficients are also shown in Table 5. The values of the sample of the sample No. 04 in the First Example are also shown in Tables 4 and 5.

TABLE 4

| No. | Particle size distribution in porous iron powder B % | | | Atomized iron powder (+#90) % | Ratio of powder with pores having a diameter of not less than 50 μm in +#90 iron powder % |
|---|---|---|---|---|---|
| | +#90 | -#90 +#140 | -#140 | | |
| 04 | 2.80 | 24.3 | 72.9 | 0.00 | 85.0 |
| 15 | 2.72 | 24.3 | 72.9 | 0.08 | 82.5 |
| 16 | 2.64 | 24.3 | 72.9 | 0.16 | 80.0 |
| 17 | 2.47 | 24.3 | 72.9 | 0.33 | 75.0 |

TABLE 5

| | | | Ratio of amount of pores to total number of pores % | | | | |
|---|---|---|---|---|---|---|---|
| No. | Area ratio of pores % | Total number of pores/mm² | more than 100 μm | more than 80 μm and not more than 100 μm | more than 60 μm and not more than 80 μm | more than 40 μm and not more than 60 μm | not more than 40 μm | Friction coefficient |
| 04 | 26 | 2340 | 0.0 | 0.3 | 0.8 | 1.3 | 97.6 | 0.11 |
| 15 | 27 | 2500 | 0.0 | 0.3 | 0.8 | 1.3 | 97.6 | 0.11 |
| 16 | 26 | 2450 | 0.0 | 0.1 | 0.5 | 1.3 | 98.1 | 0.13 |
| 17 | 25 | 2400 | 0.0 | 0.0 | 0.2 | 1.3 | 98.5 | 0.17 |

As is apparent from Tables 4 and 5, effects due to the number of pores in a hollow shape of not less than 50 μm formed on the inside of the particles larger than 90 sieve mesh in the porous iron powder B are shown. In the sample of the oil-impregnated sintered bearing of the sample No. 04, 85% of the particles larger than 90 sieve mesh were powders with pores of not smaller than 50 μm formed on the inside. Here, when the ratio of the powder with pores of not less than 50 μm formed on the inside of the particles larger than 90 sieve mesh was described by substituting the solid atomized iron powders for a part of the particles larger than 90 sieve mesh in the porous iron powder B, the numbers of pores of greater than 80 μm and not greater than 100 μm and pores of greater than 60 μm and not greater than 80 μm were decreased as the ratio of the powder with pores of not less than 50 μm formed on the inside was decreased, whereby the fluid permeability was decreased and the friction coefficient was increased. In addition, when the ratio of the powder with pores of not less than 50 μm formed on the inside of the particles larger than 90 sieve mesh was not less than 80%, the friction coefficient was not smaller than 0.15. In contrast, when the ratio of the powder with pores of not less than 50 μm formed on the inside of the particles larger than 90 sieve mesh was less than 80%, the friction coefficient was more than 0.15.

As described above, it was confirmed that the ratio of the powder with pores of not smaller than 50 μm formed on the inside of the particles larger than 90 sieve mesh in the porous iron powder B was set to be not less than 80% with respect to the powder.

measured as in the case of the First Example. The measured results of the frictional coefficients are also shown in Table 7. The values of the sample of the sample No. 04 in the First Example are also shown in Tables 6 and 7.

TABLE 6

| No. | Particle size distribution of porous iron powder B % | | | Atomized iron powder (−#90~+#140) % | Ratio of powder with pores having a diameter of 40 to 60 μm in −#90 to +#140 iron powder % |
|---|---|---|---|---|---|
| | +#90 | −#90 +#140 | −#140 | | |
| 04 | 2.8 | 24.30 | 72.9 | 0.00 | 65.0 |
| 18 | 2.8 | 23.37 | 72.9 | 0.93 | 62.5 |
| 19 | 2.8 | 22.43 | 72.9 | 1.87 | 60.0 |
| 20 | 2.8 | 20.56 | 72.9 | 3.74 | 55.0 |

TABLE 7

| No. | Area ratio of pores % | Total number of pores/mm² | Ratio of amount of pores to total number of pores % | | | | | Friction coefficient |
|---|---|---|---|---|---|---|---|---|
| | | | more than 100 μm | more than 80 μm and not more than 100 μm | more than 60 μm and not more than 80 μm | more than 40 μm and not more than 60 μm | not more than 40 μm | |
| 04 | 26 | 2340 | 0.0 | 0.3 | 0.8 | 1.3 | 97.6 | 0.11 |
| 18 | 26 | 2300 | 0.0 | 0.3 | 0.8 | 1.3 | 97.6 | 0.11 |
| 19 | 25 | 2250 | 0.0 | 0.3 | 0.8 | 0.8 | 98.1 | 0.12 |
| 20 | 24 | 2200 | 0.0 | 0.3 | 0.8 | 0.3 | 98.6 | 0.16 |

5. Fifth Example

Atomized iron powder (solid, that is, there were no pores on the inside thereof) was classified by using a sieve of 90 mesh and a sieve of 140 mesh, whereby particles smaller than 90 sieve mesh and larger than 140 sieve mesh were prepared. A porous iron powder B in which the solid atomized iron powders were substituted for a part of the particles smaller than 90 sieve mesh and larger than 140 sieve mesh was produced by adding this classified atomized iron powder to the porous iron powder B classified in the Third Example at the mixing ratio shown in Table 6. Then, 8.8 mass % (an amount of the porous iron powder A was 90% of the iron powder) of this porous iron powder B, 5 mass % of the electrolytic copper powder, 6 mass % of the beaten-copper powder, and 1 mass % of the tin powder, used in the First Example, were added to the porous iron powder A used in the First Example, whereby raw powders were obtained. These raw powders were compacted and sintered, as in the case of the First Example, whereby sintered compact samples of samples Nos. 18 to 20 were formed.

In these sintered compact samples, the area ratio of pores, the total number of pores, and the ratios of the amounts of the pores that were classified into four sizes to the total number of pores were investigated as in the case of the First Example. These results are shown in Table 7. Moreover, in these sintered compact samples, frictional coefficients were As is apparent from Tables 6 and 7, effects due to the number of pores in a hollow shape of 40 to 60 μm formed on the inside of the particles larger than 90 sieve mesh in the porous iron powder B are shown. In the sample of the oil-impregnated sintered bearing of the sample No. 04, 65% of the particles smaller than 90 sieve mesh and larger than 140 sieve mesh were powders with pores of 40 to 60 μm formed on the inside. Here, when the ratio of the powder with pores of 40 to 60 μm formed on the inside of the particles smaller than 90 sieve mesh and larger than 140 sieve mesh was described by substituting the solid atomized iron powders for a part of the particles smaller than 90 sieve mesh and larger than 140 sieve mesh in the porous iron powder B, the fluid permeability was decreased and the friction coefficient was increased, as the ratio of the powder was decreased. In addition, when the ratio of the powder with pores of 40 to 60 μm formed on the inside of the particles smaller than 90 sieve mesh and larger than 140 sieve mesh was not less than 60%, the friction coefficient was not more than 0.15. In contrast, when the ratio of the powder with pores of 40 to 60 μm formed on the inside was less than 60%, the friction coefficient was more than 0.15.

As described above, it was confirmed that the ratio of the powder with pores of 40 to 60 μm formed on the inside of the particles smaller than 90 sieve mesh and larger than 140 sieve mesh in the porous iron powder B was set to be not less than 60% with respect to the powder.

6. Sixth Example

The porous iron powder A, the porous iron powder B, the electrolytic copper powder, the beaten-copper powder, and the tin powder, prepared in the First Example were used. Raw powders having different mixing ratios of copper powder were produced by changing the mixing ratio of the electrolytic copper powder to ratios shown in Table 8. The ratio of the porous iron powder A and the porous iron powder B was adjusted so that an amount of the porous iron powder A was 70% with respect to the iron powder. These raw powders were compacted by using different-sized core rods, so as to have the same sintered size as those in the case of the First Example, and were sintered, as in the case of the First Example, whereby cylindrical sintered compacts having the same sintered size as those in the case of the First Example were produced. Next, the sintered compacts were recompressed as in the case of the First Example, that is, in conditions in which the recompression allowances were the same as those in the First Example, whereby sintered compact samples of samples Nos. 21 to 28 were formed. In these sintered compact samples, the area ratio of pores, the total number of pores, and the ratios of the amounts of the pores that were classified into four sizes to the total number of pores were investigated as in the case of the First Example. These results are shown in Table 9. Moreover, in these sintered compact samples, frictional coefficients were measured as in the case of the First Example. The measured results of the frictional coefficients are also shown in Table 9. The values of the sample of the sample No. 04 in the First Example are also shown in Tables 8 and 9.

TABLE 8

| | Miixing ratio mass % | | | | | Overall composition mass % | | |
|---|---|---|---|---|---|---|---|---|
| No. | Porous iron powder A | Porous iron powder B | Electrolytic copper powder | Beaten-copper powder | Tin powder | Fe | Cu | Sn |
| 21 | Bal. | 9.20 | 1.0 | 6.0 | 1.0 | Bal. | 7.0 | 1 |
| 22 | Bal. | 8.90 | 4.0 | 6.0 | 1.0 | Bal. | 10.0 | 1 |
| 04 | Bal. | 8.80 | 5.0 | 6.0 | 1.0 | Bal. | 11.0 | 1 |
| 23 | Bal. | 7.90 | 14.0 | 6.0 | 1.0 | Bal. | 20.0 | 1 |
| 24 | Bal. | 6.90 | 24.0 | 6.0 | 1.0 | Bal. | 30.0 | 1 |
| 25 | Bal. | 5.90 | 34.0 | 6.0 | 1.0 | Bal. | 40.0 | 1 |
| 26 | Bal. | 4.90 | 44.0 | 6.0 | 1.0 | Bal. | 50.0 | 1 |
| 27 | Bal. | 4.00 | 53.0 | 6.0 | 1.0 | Bal. | 59.0 | 1 |
| 28 | Bal. | 3.40 | 59.0 | 6.0 | 1.0 | Bal. | 65.0 | 1 |

As is apparent from Table 9, in the oil-impregnated sintered bearing of the sample No. 21 including less than 10 mass % of Cu in the overall composition, the copper alloy phase for improving adaptability to the shaft was insufficient, whereby the frictional coefficient was 0.15 and was high.

On the other hand, in the oil-impregnated sintered bearing of the sample No. 22 including 10 mass % of Cu in the overall composition, the amount of the copper alloy phase was sufficient, whereby the frictional coefficient was decreased to 0.13. According to the increase in the amount of Cu in the overall composition, the amount of the copper alloy phase was increased. Therefore, when the amount of Cu in the overall composition was less than 30 mass %, the adaptability of the oil-impregnated sintered bearing to the shaft was increased, whereby the frictional coefficient was further decreased. Meanwhile, according to the increase in the amount of Cu, the amount of the iron phase was decreased, and therefore, the total number of pores was decreased, and in the sample of the oil-impregnated sintered bearing in which the amount of Cu was more than 30%, the frictional coefficient was increased. Nevertheless, the total number of pores was not less than 800 per mm$^2$ and was sufficient until the amount of Cu in the overall composition was 59 mass %, and the frictional coefficient was not more than 0.13.

On the other hand, in the oil-impregnated sintered bearing of the sample No. 28 including Cu at greater than 59 mass % in the overall composition, the amount of Cu was excessive, whereby the total number of pores was less than 800 per mm$^2$, and the oil-retaining characteristics were low. Moreover, the ratios of the pores with circle-equivalent diameters of greater than 40 μm and not greater than 60 μm and the pores with circle-equivalent diameters of greater than 60 μm and not greater than 80 μm were too great, whereby the fluid permeability was increased, and the oil pressure dropped due to leakage. As a result, an oil film was not maintained, and the metallic contacts occurred, whereby the frictional coefficient was increased to 0.17. As described above, it was confirmed that the amount of Cu in the overall composition was set to be in a range of 10 to 59 mass %.

What is claimed is:

1. An oil-impregnated sintered bearing made of an iron-copper sintered alloy consisting essentially of, by mass %, 10 to 59% of Cu, 0.5 to 3% of Sn, and the balance of Fe and inevitable impurities, the oil-impregnated sintered bearing including pores in a matrix of the iron-copper sintered alloy at a total of not less than 800 per mm$^2$,

TABLE 9

| | | | Ratio of amount of pores to total number of pores % % | | | | |
|---|---|---|---|---|---|---|---|
| No. | Area ratio of pores % | Total number of pores/mm$^2$ | more than 100 μm | more than 80 μm and not more than 100 μm | more than 60 μm and not more than 80 μm | more than 40 μm and not more than 60 μm | not more than 40 μm | Friction coefficient |
| 21 | 23 | 2980 | 0.0 | 0.0 | 0.3 | 0.6 | 99.1 | 0.15 |
| 22 | 24 | 2720 | 0.0 | 0.1 | 0.5 | 0.8 | 98.6 | 0.13 |
| 04 | 26 | 2340 | 0.0 | 0.3 | 0.8 | 1.3 | 97.6 | 0.11 |
| 23 | 27 | 2150 | 0.1 | 0.4 | 0.9 | 1.5 | 97.1 | 0.12 |
| 24 | 28 | 1890 | 0.2 | 0.5 | 1.0 | 1.8 | 96.5 | 0.12 |
| 25 | 29 | 1510 | 0.3 | 0.7 | 1.2 | 2.2 | 95.6 | 0.13 |
| 26 | 31 | 1120 | 0.4 | 0.9 | 1.4 | 2.6 | 94.7 | 0.13 |
| 27 | 32 | 800 | 0.5 | 1.0 | 1.5 | 3.0 | 94.0 | 0.13 |
| 28 | 33 | 540 | 0.6 | 1.1 | 1.6 | 3.3 | 93.4 | 0.17 | the oil-impregnated sintered bearing having an inner circumferential surface at which the pores are exposed at 20 to 50% by area ratio, the oil-impregnated sintered bearing exhibiting a pore size distribution in which the number of pores with circle-equivalent diameters of greater than 100 μm is not more than 0.5% with respect to the total number of pores, the number of pores with circle-equivalent diameters of greater than 80 μm and not greater than 100 μm is not more than 0.1% with respect to the total number of pores, the number of pores with circle-equivalent diameters of greater than 60 μm and not greater than 80 μm is 0.5 to 1.5% with respect to the total number of pores, the number of pores with circle-equivalent diameters of greater than 40 μm and not greater than 60 μm is 0.8 to 3% with respect to the total number of pores, and the remainder of the pores are pores with circle-equivalent diameters of less than 40 μm.

2. The oil-impregnated sintered bearing according to claim 1, further including at least one of Zn and Ni at not more than 5 mass % in the overall composition.

3. The oil-impregnated sintered bearing according to claim 1, wherein at least one kind of solid lubricant component selected from the group consisting of graphite, molybdenum disulfide, manganese sulfide, and calcium fluoride is dispersed in the pores in the matrix of the iron-copper sintered alloy at 0.2 to 2 mass parts with respect to 100 mass parts of the iron-copper sintered alloy.

\* \* \* \* \*